(12) United States Patent
Sorkine Hornung et al.

(10) Patent No.: US 10,171,785 B2
(45) Date of Patent: Jan. 1, 2019

(54) COLOR BALANCING BASED ON REFERENCE POINTS

(71) Applicant: Disney Enterprises, Inc., Burbank, CA (US)

(72) Inventors: Alexander Sorkine Hornung, Zurich (CH); Thomas Oskam, Schaffhausen (CH); Robert Walker Sumner, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/345,240

(22) Filed: Nov. 7, 2016

(65) Prior Publication Data

US 2017/0078635 A1    Mar. 16, 2017

Related U.S. Application Data

(63) Continuation of application No. 14/086,660, filed on Nov. 21, 2013, now Pat. No. 9,491,428.

(60) Provisional application No. 61/817,123, filed on Apr. 29, 2013.

(51) Int. Cl.
| | |
|---|---|
| *H04N 9/73* | (2006.01) |
| *H04N 1/60* | (2006.01) |
| *H04N 9/69* | (2006.01) |
| *G09G 5/02* | (2006.01) |
| *G06T 11/00* | (2006.01) |

(52) U.S. Cl.
CPC .............. *H04N 9/73* (2013.01); *H04N 1/603* (2013.01); *H04N 1/6077* (2013.01)

(58) Field of Classification Search
CPC combination set(s) only.
See application file for complete search history.

(56) References Cited

U.S. PATENT DOCUMENTS

| | | | |
|---|---|---|---|
| 2006/0226338 A1* | 10/2006 | Tojima | H04N 1/506 250/208.1 |
| 2014/0119595 A1* | 5/2014 | Gallo | G06T 3/0081 382/103 |
| 2014/0233914 A1* | 8/2014 | Williams | G11B 27/031 386/280 |
| 2014/0320519 A1* | 10/2014 | Sorkine Hornung | H04N 1/6077 345/591 |
| 2015/0138223 A1* | 5/2015 | Sorkine Hornung | H04N 1/603 345/591 |
| 2015/0312595 A1* | 10/2015 | Vanam | H04N 19/80 375/240.29 |

* cited by examiner

*Primary Examiner* — Wesner Sajous
(74) *Attorney, Agent, or Firm* — Patterson + Sheridan, LLP

(57) ABSTRACT

Embodiments provide techniques for adjusting coloration of an image. A first selection of first one or more reference points within a first image is received. A second selection of a second one or more reference points within a second image is also received. Embodiments determine a coloration difference between a coloration of the first one or more reference points within the first image and a coloration of the second one or more reference points within the second image. The coloration of at least a portion of the first image is then adjusted, based on the determined coloration difference.

20 Claims, 9 Drawing Sheets
(1 of 9 Drawing Sheet(s) Filed in Color)

COLOR BALANCING BASED ON REFERENCE POINTS

CROSS-REFERENCE TO RELATED APPLICATIONS

This application is a continuation of co-pending U.S. patent application Ser. No. 14/086,660, filed on Nov. 21, 2013, which claims benefit of U.S. provisional patent application Ser. No. 61/817,123, filed Apr. 29, 2013. Each of the aforementioned related patent applications are herein incorporated by reference in its entirety.

BACKGROUND

Field of the Invention

Embodiments described herein relate to color balancing techniques, and more specifically to color balancing an image (or frame) based on comparisons between the image and a reference image.

Description of the Related Art

Computer graphics technology has come a long way since video games were first developed. Relatively inexpensive 3D graphics engines now provide nearly photo-realistic interactive game play on hand-held video game, home video game and personal computer hardware platforms costing only a few hundred dollars. These video game systems typically include a hand-held controller, game controller, or, in the case of a hand-held video game platform, an integrated controller. A user or player uses the controller to send commands or other instructions to the video game system to control a video game or other simulation being played. For example, the controller may be provided with a manipulator (e.g., a joystick) and buttons operated by the user.

Many hand-held gaming devices include some form of camera device which may be used to capture an image or a series of images of a physical, real-world scene. The captured images can then be displayed, for instance, on a display of the hand-held gaming device. Certain devices may be configured to insert virtual objects into the captured images before the images are displayed. Additionally, other devices or applications may enable users to draw or paint particular within a captured image of a physical scene. However, as such alterations apply only to a single image of the physical scene, subsequent captured images of the physical scene from different perspectives may not incorporate the user's alterations. Furthermore, alterations by the system (e.g., a camera device that is currently filming a scene) may automatically adjust visual factors such as white balance, brightness, contrast and other various image parameters, in order to optimize the camera device under varying lighting conditions. However, because such alterations are performed at the camera level, they do not apply to virtual objects inserted into the visual scene. Moreover, such alterations may differ from one camera device to another, depending on the lighting conditions of the specific camera. As such, when compositing two or more video streams into a single video stream, these varying image parameters can cause distortions and other problems in the composited video stream.

Digital images are used in a wide array of different applications. In many applications, some form of image analysis and manipulation can be performed to enhance the picture quality of the digital images. For example, the quality of a digital image may be dependent on color levels and color intensity within the image, as unrealistic coloration within an image may degrade the visual quality of the image. When capturing a digital photo (e.g., with a digital camera device or a mobile device configured with a digital camera), characteristics of the ambient environment, e.g., lighting, reflections, etc., may impact the coloration of the digital picture, and in some cases may result in an unrealistic coloration for certain objects in the digital picture.

To address this, the coloration of a photographically recorded digital image can be adjusted using various color balancing techniques. Generally, color balancing involves altering the coloration of at least part of an image (or a frame in a video) in a deliberate fashion. However, while many imperfections may be corrected through the use of color balancing techniques, which aspects of the image, e.g., hue, saturation, chrome, colorfulness, value or lightness, luminance, etc., need to be adjusted to create realistic coloration can vary dramatically.

Unfortunately, many conventional color balancing techniques may provide inadequate results. For instance, because the coloration adjustments that need to be made vary so much from one image to another, many color balancing techniques rely on some form of manual user input or intervention in order to achieve a suitable color balance. As another example, other color balancing techniques may apply a predetermined color balancing operation to an image, and may then display the altered image to a user. In such a system, the user can then manually change the coloration of the image as is necessary to produce a more realistic image (e.g., an image whose coloration more realistically reflects the coloration of the original scene captured by the image). While these techniques may produce images with realistic coloration, they are ill-suited for realtime applications, such as color balancing frames within a video stream being displayed in realtime. In addition to the realtime aspect, these manual interfaces are generally less intuitive to use. That is, with conventional techniques, abstract tools such as changing saturation, hue, contrast, gamma and more general "tone curves" are used for color balancing purposes. However, none of these tools allow a user to map colors within one image onto the colors of another image (e.g., a particular red coloration in image A should look like a slightly different red coloration in image B, a green coloration in image A should actually look like a blue coloration in image B, etc.)

SUMMARY

Embodiments generally provide techniques for adjusting coloration. One embodiment provides a method, system and computer-readable medium for adjusting coloration that includes receiving a first selection of first one or more reference points within a first image and receiving a second selection of a second one or more reference points within a second image. The method, system and computer-readable medium also include determining a coloration difference between a coloration of the first one or more reference points within the first image and a coloration of the second one or more reference points within the second image. Additionally, the method, system and computer-readable medium include adjusting the coloration of at least a portion of the first image, based on the determined coloration difference.

BRIEF DESCRIPTION OF THE DRAWINGS

So that the manner in which the above recited aspects are attained and can be understood in detail, a more particular description of embodiments of the invention, briefly summarized above, may be had by reference to the appended drawings. The patent or application file contains at least one drawing executed in color. Copies of this patent or patent application publication with color drawing(s) will be provided by the Office upon request and payment of the necessary fee.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
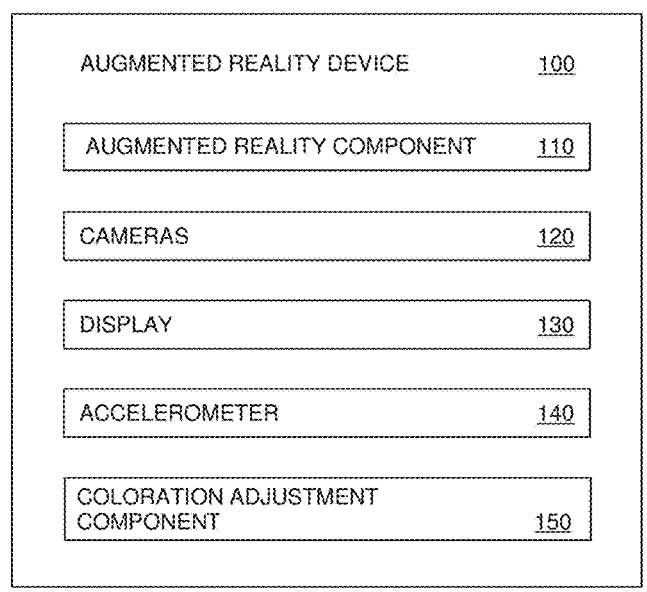
FIG. 1 is a block diagram illustrating an augmented reality device configured with an augmented reality component, according to one embodiment described herein.

Generally, embodiments provide techniques for color balancing content. In one embodiment, the augmented content is displayed using one or more display devices on an augmented reality device. As used herein, an augmented reality device refers to any device capable of displaying a real-time view of a physical, real-world environment while altering or inserting elements within the displayed view of the environment. As such, unlike a virtual reality device which displays a view of virtual world, an augmented reality device displays a view of the real world but augments elements using computer graphics technology. Such an augmented reality device may include or be communicatively coupled to a camera device (or multiple camera devices) used to capture a view of the real-world environment and may further include computer software or hardware configured to augment elements of the captured scene. For example, an augmented reality device could capture a series of images of a coffee cup sitting on top of a table, modify the series of images so that the coffee cup appears as an animated cartoon character and display the modified series of images in real-time to a user. As such, when the user looks at the augmented reality device, the user sees an augmented view of the physical real-world environment in which the user is located.

In one embodiment, techniques are provided for augmenting the coloration of at least a first object in a visual scene. For instance, logic on an augmented reality device could capture a visual scene for display. Here, the visual scene could include a physical object and could be captured using one or more camera devices. The logic could then identify the physical object as a first predetermined object type, based on one or more object identifiers associated with the physical object. For example, the logic could identify a shape and coloration of the physical object, and could use this information to identify a predefined object profile that matches the shape and coloration of the physical object. As another example, the logic could determine an approximate size of the physical object, based on the object's appearance relative to other objects within the captured frames, and could further use this size information to identify the predefined object profile.

For instance, the logic (or software) could be configured to identify the object type of the physical object based on its shape. For instance, the software on the augmented reality device could analyze the visual scene to determine a plurality of edges of the physical object within the visual scene, and could use the determined plurality of edges to identify the predetermined object type of the physical object. In one embodiment, the physical object is configured with a transmitter (e.g., a RF transmitter) that transmits a signal with embedded data specifying an object type identification code. Software on the augmented reality device could receive the signal and could determine the predetermined object type of the physical object, based on the specified object type identification code.

The logic on the augmented reality device could then retrieve visual characteristics information corresponding to the first predetermined object type, where the visual characteristics information contains coloration information for the physical object. In one embodiment, the visual characteristics information describes the coloration of the physical object when captured by a camera device under neutral lighting conditions. Such visual characteristics information may also include, without limitation, sizing information (e.g., physical dimensions), additional coloration information (e.g., the physical object when captured by a camera device under other lighting conditions), texture information, shape information, reflectivity information and so on. More generally, it is broadly contemplated that the object profile may contain any information relating to visual attributes of the physical object.

The logic could then render a sequence of frames for display, where the coloration of at least one object within the sequence of frames is augmented. Here, the logic could render the frames, such that the appearance of the at least one object in the rendered sequence of frames is augmented based on a comparison of the coloration of the at least one object within the captured visual scene to the coloration described by the visual characteristics information. The logic could then output the rendered frames for display.

For example, the logic could detect a reference object within the captured visual scene, and could retrieve visual characteristics information describing the coloration of the reference object under neutral lighting conditions. The logic could then augment the coloration of at least a portion of the captured visual scene, based on a coloration difference between the appearance of the reference object within the captured visual scene and the visual characteristics information. For example, if the logic detects that the reference object appears to have more red and green coloration within the captured visual scene, relative to the appearance of the reference object described by the visual characteristics information, the logic could then augment one or more objects within the visual scene to also include more red and green coloration. For example, in an embodiment where the logic is implemented on an augmented reality device, the logic could render a sequence of frames in which a virtual object is inserted into the captured visual scene, and the logic could further alter the appearance of the virtual object to match the coloration of the reference object within the captured visual scene. Thus, in this example, the logic could alter the virtual object's appearance to include additional red and green coloration, based on the comparison of the reference object's appearance to the visual characteristics information. Advantageously, doing so provides a more realistic augmented reality display, in which virtual objects inserted into the augmented reality scene are color balanced so as to match the coloration of the reference object. Moreover, while the aforementioned examples involve the addition of certain colors, these examples are for illustrative purposes only and it is broadly contemplated that any coloration adjustment may be made, consistent with the embodiments described herein.

Additionally, it is explicitly contemplated that certain embodiments described herein may exist outside of the augmented reality space. For example, one embodiment provides coloration adjustments to an image, based on a reference image and a common object between the image and the reference image. Here, the reference image could depict the common object under neutral lighting conditions, and embodiments could alter the coloration of the image (or a portion of the image) based on the common object's appearance in the image and the common object's appearance in the reference image. As another example, the reference image could depict the common object as having more stylistic or artistic colors, and embodiments could alter the coloration of the image (or a portion of the image) based on the common object's appearance in both the image and the reference image.

As another example, one embodiment provides color balancing for a combined video stream created by compositing the video streams of two or more video camera devices. In such an embodiment, a reference object may be identified within each of the video streams to be synchronized, and for each of the video streams, the reference object can be compared to retrieved visual characteristics information (also known as profile information) for the reference object that describes the coloration of the reference object under neutral lighting conditions. A difference between the coloration of each of the video streams and the coloration described in the visual characteristics information can then be calculated, and the coloration of the video streams can be color balanced based on the calculated difference. For example, embodiments could determine that a first video stream contains slightly more red coloration relative to the coloration of the reference object under neutral lighting conditions, while a second video stream contains slightly more blue coloration relative to the coloration of the reference object under neutral lighting conditions. Accordingly, the logic could color balance the video streams by slightly reducing the red coloration in the first video stream and by slightly reducing the blue coloration in the second video stream, and the color balanced video streams may then be composited into a single combined video stream. Advantageously, doing so allows for multiple video streams to be color balanced to neutral lighting conditions, through the use of a reference object within the video streams and visual characteristics information describing the reference object's appearance under neutral lighting conditions.

FIG. 1 is a block diagram illustrating an augmented reality device configured with a display correction component, according to one embodiment of the present invention. As shown, the augmented reality device 100 includes an augmented reality component 110, camera devices 120, a display device 130, an accelerometer 140 and a coloration adjustment component 150. The augmented reality component 110 may generally be configured to generate frames depicting one or more virtual objects (e.g., an animated character) inserted into a captured visual scene (e.g., captured using camera devices 120) and may output these frames for display (e.g., using display device 130).

The camera devices 120 may include cameras for capturing a visual scene. As used herein, a visual scene refers to a view(s) of the real-world environment in which the device 100 is being used. For instance, a visual scene may be a series of images of a real-world environment. The camera devices 120 may also include one or more user-facing cameras. The augmented reality component 110 or the coloration adjustment component 150 could use such a user-facing camera device 120 to, e.g., determine an angle at which the user is viewing the display device 130. Generally, the accelerometer 140 is a device capable of measuring the physical (or proper) acceleration of the augmented reality device 100. The augmented reality component 110 or the coloration adjustment component 150 may use the accelerometer 140 to, e.g., determine when the position of the augmented reality device 100 is changing, which could indicate the user's viewing angle of the display device 130 is also changing.

Generally, the coloration adjustment component 150 is configured to recognize reference object(s) within a visual scene (e.g., a series of frames captured using the camera devices 120) and to adjust the coloration of the visual scene displayed on the augmented reality device based on visual characteristics information describing the coloration of the reference object(s) under neutral lighting conditions. For instance, the coloration adjustment component 150 could analyze a visual scene captured using the cameras 120 and identify an object within the visual scene that corresponds to a predefined object profile. More specifically, as the visual scene represents a three-dimensional space (i.e., the physical environment captured using the cameras 120), the coloration adjustment component 150 could determine an area of three-dimensional space occupied by each identified predefined object. For example, the coloration adjustment component 150 could be preconfigured to retrieve predefined object profiles that include geometric data that defines visual properties (e.g., size, shape, color, etc.) for particular reference objects, and could use the geometric data to identify instances of the predefined objects within the visual scene and the three-dimensional space each object occupies.

In one embodiment, the predefined physical object is configured with a transmitter (e.g., a radio frequency (RF) transmitter) that sends out a signal encoded with data specifying a type identifier. In such an embodiment, the coloration adjustment component 150 could receive the signal (e.g., using a receiver or transceiver on the augmented reality device 100) and could determine the type identifier encoded within the signal. The coloration adjustment component 150 could then determine the type of the reference object, based on the type identifier, and could retrieve the corresponding object profile.

Upon identifying the predefined reference object within the visual scene, the coloration adjustment component 150 could then retrieve a predefined object profile associated with the identified object. Such an object profile could specify visual attributes of the physical object such as the shape of the reference object and the coloration of the reference object under neutral lighting conditions. The coloration adjustment component 150 could then render a series of frames depicting an augmented virtual scene, based on the retrieved object profile and the appearance of the physical object within the captured visual scene. For example, the coloration adjustment component 150 could determine a coloration difference between the coloration for the reference object described in the object profile and the appearance of the reference object within the captured visual scene. The coloration adjustment component 150 could then augment the appearance of one or more objects within the series of frames, based on the determined coloration difference. For example, the coloration adjustment component 150 could insert one or more virtual objects into the rendered series of frames, and could augment the appearance of the virtual object(s) based on the determined coloration difference. Doing so helps to enhance the realistic appearance of the virtual object(s) within the series of frames.

Figure 2A:
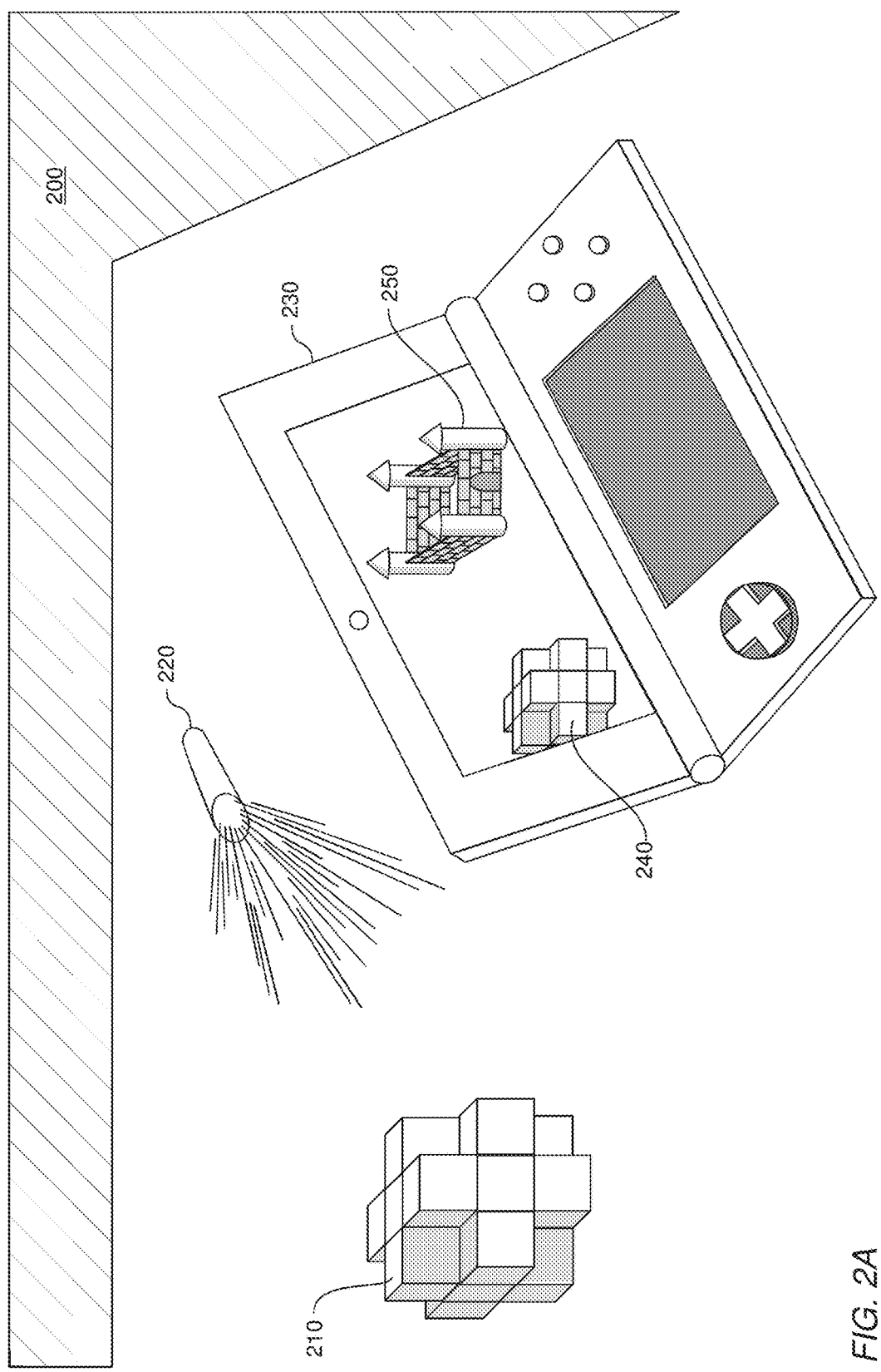
FIG. 2A-B illustrate environments being captured using one or more camera devices, according to embodiments described herein.
Figure 2B:
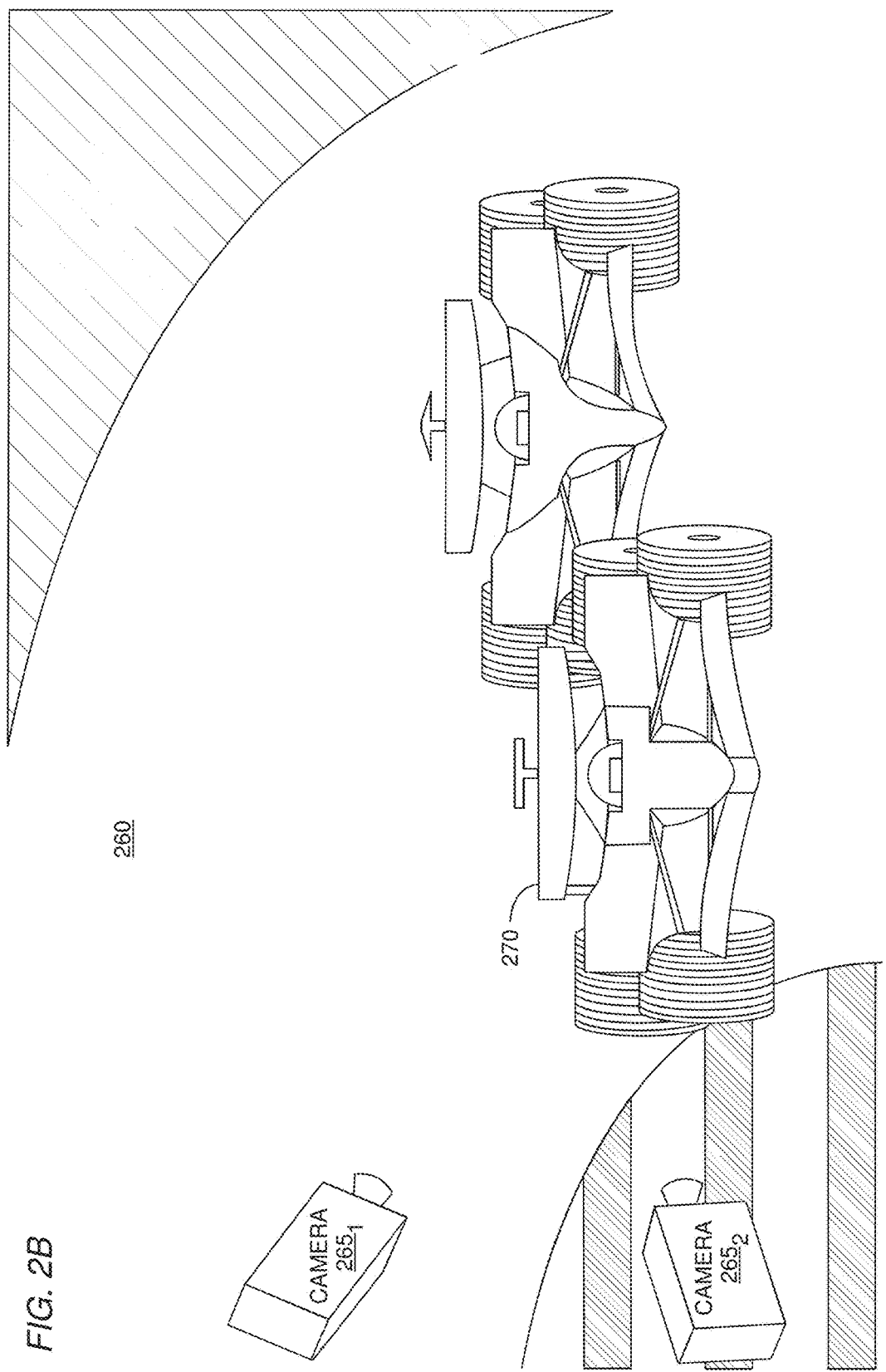

FIG. 2A-B illustrate environments being captured using one or more camera devices, according to embodiments described herein. As shown, FIG. 2A illustrates an environment being viewed with an augmented reality device, according to one embodiment described herein. As shown, the environment 200 includes a physical object 210, a light source 220 and an augmented reality device 230. The augmented reality device 230 includes a display device that depicts a representation 240 of the physical object 210 and a virtual object 250. Here, the augmented reality component 110 has inserted the virtual object 250 into the scene displayed on the augmented reality device 230.

Here, the coloration adjustment component 150 could augment the coloration of the virtual object 250, based on a reference image. For example, the reference image could include a depiction of the physical object 210 under neutral lighting conditions. The coloration adjustment component 150 could identify the physical object 210 within the captured visual scene (e.g., one or more frames captured by a camera device(s) of the augmented reality device 230) and could calculate a coloration difference between the physical object's appearance within the captured visual scene and the physical object's appearance in the reference image. The coloration adjustment component 150 could then augment the appearance of the virtual object 250 based on the coloration difference, and could output the augmented virtual object 250 for display. For example, the coloration adjustment component 150 could adjust the coloration of the virtual object 250, based on the coloration difference calculated for the physical object. Advantageously, doing so allows the augmented reality device 230 to display more realistic virtual objects by adjusting the appearance of the virtual objects based on the lighting conditions of the augmented reality device 230.

FIG. 2B illustrates an environment being viewed with multiple camera devices, according to one embodiment described herein. The environment 260 depicts a portion of a race track which is being filmed by camera devices $265_{1-2}$. Here, each of the camera devices $265_{1-2}$ is configured to capture a sequence of frames representing the environment 260 when viewed from a certain perspective. In some situations, it may be desirable to composite the video streams captured by the cameras $265_{1-2}$ (and potentially video streams from other cameras as well) into a single composite video stream, e.g., in order to produce a particular cinematic effect.

In such an embodiment, the coloration adjustment component 150 could be configured to identify the race car 270 as a reference object within the captured video streams for each of the cameras $265_{1-2}$. In response to identifying the reference object, the coloration adjustment component 150 could retrieve coloration information (e.g., color profile information) corresponding to the race car 270 that describes coloration of the race car 270 under predefined lighting conditions (e.g., neutral lighting conditions). The coloration adjustment component 150 could then color balance the video streams from the cameras $265_{1-2}$, based on the retrieved coloration information and the appearance of the race car 270 within each of the video streams. For instance, the coloration adjustment component 150 could determine a coloration difference between the retrieved coloration information and the race car's 270 appearance within a first frame of the video stream from the camera device $265_1$. The coloration adjustment component 150 could then adjust the coloration within the frame (and potentially other frames within the video stream as well), based on the inverse of the determined coloration difference.

For example, the coloration adjustment component 150 could determine that the race car 270 appears to have less green coloration but more red and blue coloration within the captured frame, relative to the retrieved coloration information describing coloration of the race car 270 under predefined lighting conditions. Based on this, the coloration adjustment component 150 could adjust the frame to increase the green coloration and to decrease the red and blue coloration of each pixel of the frame, so that the race car 270 within the adjusted frame has the same coloration as when viewed in the predefined lighting conditions. The coloration adjustment component 150 could then perform similar processing on each of the frames for each of the video streams from the cameras $265_{1-2}$, so that the coloration of each frame matches the predefined lighting conditions. In other words, the coloration adjustment component 150 could color balance the coloration of the video streams from the cameras $265_{1-2}$ based on the race car's 270 appearance within the frames and based on the retrieved coloration information. Once the video streams are color balanced, the coloration adjustment component 150 could composite the video streams together into a single composite video stream. Advantageously, by color balancing the video streams through the use of the reference object 270, embodiments can create an improved composite video stream and can do so without requiring a user to manually adjust the coloration of the individual video streams.

In a particular embodiment, it may be preferable for the composite video stream to have a different coloration than the retrieved coloration information, which depicts the reference object 270 under predefined lighting conditions. In such an embodiment, the composite video stream could still be created using the color balanced video streams from the cameras $265_{-2}$, and then an additional coloration adjustment could be applied to the composite video stream in order to achieve the desired coloration.

Figure 3:
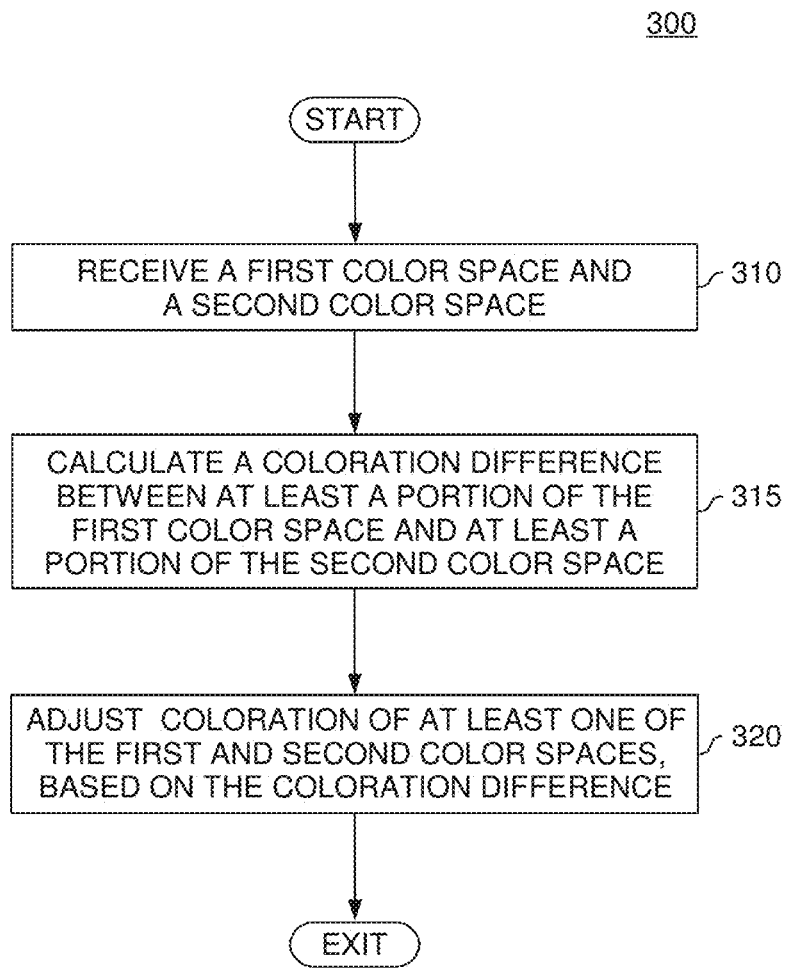
FIG. 3 is a flow diagram illustrating a method for adjusting the coloration of video data, according to embodiments described herein.

FIG. 3 is a flow diagram illustrating a method for adjusting the coloration of video data, according to embodiments described herein. As shown, the method 300 begins at block 310, where the coloration adjustment component 150 receives a first color space and a second color space. Generally, the first and second color spaces represent any content composed using at least one color. Examples of such color spaces include, without limitation, image content, video content, rendered content (e.g., an augmented reality object), a coloration profile describing coloration of a reference object under predefined lighting conditions, and so on.

The coloration adjustment component 150 then calculates a coloration difference based on at least a portion of the first color space and at least a portion of the second color space (block 315). For example, the coloration adjustment component 150 could identify a reference point within each of the first and second color spaces (e.g., based on user selections). The coloration adjustment component 150 could then compare the coloration of each of the reference points to calculate the coloration difference between the color spaces.

As shown, the coloration adjustment component 150 adjusts the coloration of at least one of the first and second color spaces, based on the calculated coloration difference (block 320), and the method 300 ends. For example, the coloration adjustment component 150 could alter the coloration of a first video stream (e.g., the first color space), to synchronize the first video stream with a second video stream (e.g., the second color space). As another example, the first color space could represent a video stream, and the second color space could represent a rendered object being inserted into the video stream as part of an augmented reality application. In such an example, the coloration adjustment component 150 could alter the coloration of a rendered object (e.g., the first color space) to match the coloration of the video stream.

Figure 4A:
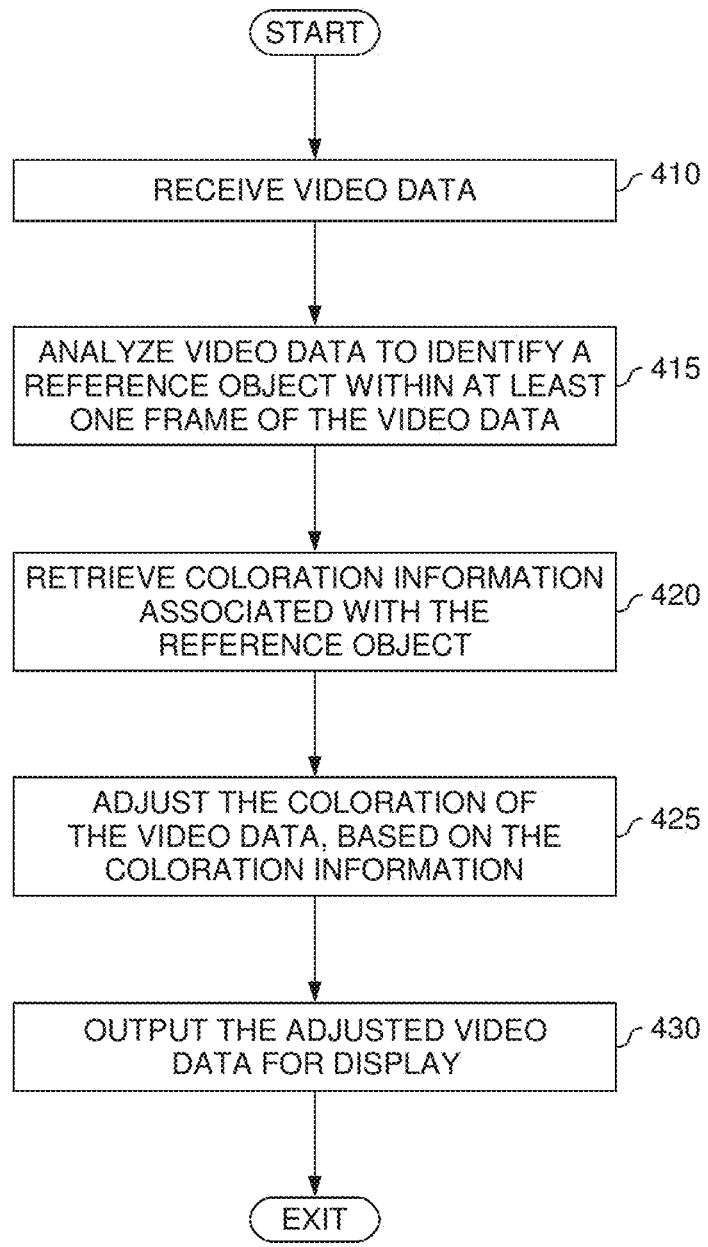
FIGS. 4A-B are flow diagrams illustrating particular methods for adjusting the coloration of video data, according to embodiments described herein.
Figure 4B:
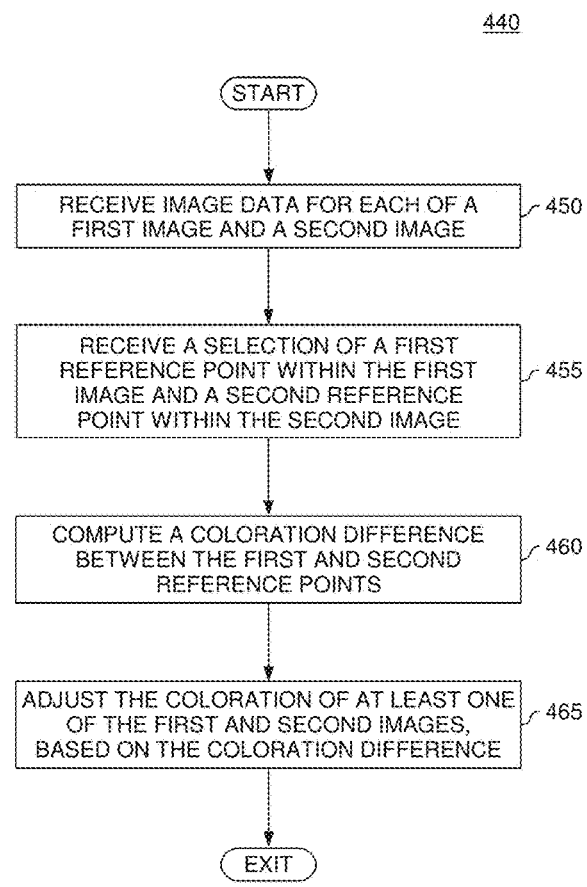

FIGS. 4A-B depict particular examples of the method 300 shown in FIG. 3. For instance, FIG. 4A is a flow diagram illustrating a method for adjusting the coloration of video data based on a reference object within the video data, according to one embodiment described herein. As shown, the method 400 begins at block 410, where the coloration adjustment component 150 receives video data. Generally, the video data represents a video sequence and includes visual data for a plurality of frames. For example, the video data could be captured by one or more camera devices on an augmented reality device (e.g., the device 100). As another example, the video data could be captured using a stand-alone video camera (e.g., the cameras $265_{1-2}$). More generally, it is broadly contemplated that the video data received at block 410 may be represent any sort of video sequence, captured using any sort of camera device(s) and in a variety of different contexts (e.g., augmented reality, a sporting event, etc.). Moreover, the examples provided herein are without limitation and are provided for illustrative purposes only.

Upon receiving the video data, the coloration adjustment component 150 analyzes the video data to identify a reference object within at least one frame of the video data (block 415). As discussed above, the reference object may be any object for which the coloration adjustment component 150 maintains (or has access to) coloration data. As an example, the physical object 210 depicted in FIG. 2 could serve as a reference object in one embodiment. As another example, the race car 270 could serve as a reference object. Upon identifying the reference object, the coloration adjustment component 150 retrieves coloration profile data corresponding to the reference object (block 420). Generally, the coloration profile data describes a coloration of the reference object under predefined lighting conditions.

The coloration adjustment component 150 then adjusts the coloration of the video data, based on the retrieved coloration data (block 425). For example, in one embodiment, the coloration adjustment component 150 could adjust the coloration of the captured video data to match the predefined lighting conditions described in the coloration profile. As another example, the coloration adjustment component 150 could adjust the coloration of a virtual or augmented reality object being inserted into the video data, based on a coloration difference between the reference object's coloration within the frame of video data and the reference object's coloration as described by the coloration profile data. Advantageously, by adjusting the coloration of the augmented reality object to match the coloration of the captured video data, the coloration adjustment component 150 can enhance the realism of the augmented reality object inserted into the video data.

The coloration adjustment component 150 then outputs the adjusted video data for display (block 430), and the method 400 ends. As an example, the coloration adjustment component 150 could determine that the reference object appears as having a particular amount of increased red coloration within the received video data, relative to the coloration of the reference object within the retrieved coloration data. Based upon this determination, the coloration adjustment component 150 could adjust the coloration of the video data to remove the particular amount of red coloration from the video data. Doing so adjusts the coloration of the frame of video data to match the predefined lighting conditions of the coloration data.

As another example, the coloration adjustment component 150 could adjust the coloration of a virtual object inserted into the video data, based on the reference object's coloration within the video data relative to the reference object's coloration as described by the coloration data. For instance, as part of inserting a virtual object into the video data (e.g., a virtual character in an augmented reality space, a graphic such as a channel logo, etc.), the coloration adjustment component 150 could adjust the coloration of the virtual object based on the coloration data. Thus, in the above example where the reference object has a particular amount of increased red coloration within the received video data, the coloration adjustment component 150 could adjust the coloration of the virtual object by increasing the virtual object's red coloration by the particular amount. Advantageously, doing so helps to enhance the realism of the virtual object within the video data.

While the method 400 pertains to adjusting the coloration of one or more frames of video data, particular embodiments may be configured to adjust the coloration within an image based on a reference object's appearance within the image. In such an embodiment, the coloration adjustment component 150 could identify the reference object within the image and could adjust at least a portion of the image's coloration based on coloration information associated with the identified reference object. For example, the coloration adjustment component 150 could adjust the entire image's coloration based on the coloration data, such that the adjusted image's coloration would match the predefined lighting conditions represented in the coloration information. In such an embodiment, the coloration adjustment component 150 could maintain multiple sets of coloration information for each reference object type, with each set of coloration information corresponding to a different predefined lighting configuration. By adjusting the coloration of the image using one of these sets of coloration information, the coloration adjustment component 150 could in effect alter the image to match the various predefined lighting configurations.

Another example is shown in FIG. 4B, which illustrates another example of the method 300 shown in FIG. 3. As shown, the method 440 begins at block 450, where the coloration adjustment component 150 receives image data for each of a first image and a second image. In one embodiment, the first image represents a frame from a first video stream, while the second image represents a frame from a second video stream.

The coloration adjustment component 150 then receives a selection of a first reference point within the first image and a second reference point within the second image (block 455). For example, a user could select each of the first and second reference points using an interface provided by the coloration adjustment component 150. In one embodiment, the coloration adjustment component 150 is configured to automatically determine the first reference point and the second reference point within the first and second images, based on an analysis of the first and second images. For example, the first image could represent a frame of a first video stream and the second image could represent a frame of a second video stream. In such an example, the coloration adjustment component 150 could determine the first and second reference points by tracking correspondences between frames of the first video stream and the second video stream.

Once the reference points are determined, the coloration adjustment component 150 computes a coloration difference between the first and second reference points (block 460). In one embodiment, multiple reference points can be selected within each of the first and second images, and the coloration adjustment component 150 could be configured to compute multiple coloration differences between each pair of reference points. The coloration adjustment component 150 then adjusts the coloration of at least one of the first and the second images, based on the computed coloration difference (block 465), and the method 440 ends. Doing so enables the coloration adjustment component 150 to synchronize the coloration of two images (or, e.g., two video streams), based on reference points within each of the images (or, e.g., frames of the two video streams).

More particularly, in one embodiment, the coloration adjustment component 150 is configured to transform the color gamut of an image such that colors that have references get as close as possible to that point in the color space, and colors for which no references are available are transformed in an optimal way. Here, the coloration adjustment component 150 may interpret the given color correspondences as vectors in the color space. The coloration adjustment component 150 may compute a vector field around the reference vectors to produce a transformation of the gamut. For instance, the coloration adjustment component 150 could use a normalized radial basis function interpolation that propagates these correspondence vectors (e.g., constraints) to the rest of the color space. Moreover, the coloration adjustment component 150 may optimize the shape of the radial basis function using one or more example images, as the basis function influences how the correspondence vectors are propagated through the color space and ultimately how colors without constraints are balanced.

For example, for a given pair of colors ($c_i$, $d_i$) in the three-dimensional CIE Lab space, the coloration adjustment component 150 could define $c_i$ as support points and the vectors $v_i = \|d_i - c_i\|$ as data values. For each vector $v_i$, the coloration adjustment component 150 could provide a basis function $\phi_i$ that describes the weight with which the vector is distributed in the color space. For each new point e in the color space, the coloration adjustment component 150 could compute an according translation vector v(e) as a normalized sum of the weighted $\phi_i$. An example of this is shown below in Equation 1.

Translation Vector Computation　　　　　　Equation 1

$$v(e) = \frac{1}{\sum_{i=1}^{n} \phi_i(e)} \sum_{i=1}^{n} \phi_e(e) w_i$$

The summation of the support functions allows the coloration adjustment component 150 to independent evaluate each point in the vector field, which suits a completely parallel implementation for each pixel in an image. The individual weights $w_i$ allow the coloration adjustment component 150 to treat $\phi_i$ as radial basis functions. For example, the coloration adjustment component 150 could perform radial basis function interpolation by performing a least squares minimization on the overlapping support between the individual $\phi_i$ by choosing weights $w_i$, such that the squared difference between the data vectors $v_i$ and the weighted sum of the basis functions at $c_i$ is minimized in the least squares sense. An example of this is shown in Equation 2 below.

Radial Basis Interpolation　　　　　　Equation 2

$$\underset{w_i}{\operatorname{argmin}}(\|v_i - v(c_i)\|^2)$$

As a result, the coloration adjustment component 150 may produce a system of equations $v = \Phi w$ per color dimension, where the matrix $\Phi$ is the same in all three systems and contains at each position (i, j) the normalized support of all $c_j$ seen at the interpolation point $c_i$. The coloration adjustment component 150 could then compose the weight vectors $w_i$ by inverting $\Phi$ and assembling the individual components from the three systems of equations.

However, conflicting constraints of two source colors $c_i$ and $c_j$ can cause the matrix $\Phi$ to become near-singular, which in turn causes components of the resulting $w_i$ to become negative. Here, negative values can create an inverted distribution of the constraint vectors $v_i$ in the color space and can produce undesired artifacts in the resulting image(s). To avoid this, the coloration adjustment component 150 could cluster support points that lie within the limit of perceivable distance (e.g., 1.0 in CIE Lab space). Additionally, the coloration adjustment component 150 could be configured to use basis functions with a small spread, in order to avoid large overlapping support between constraints, thereby preventing the matrix $\Phi$ from degenerating.

Generally, the coloration adjustment component 150 can be configured to use any number of different basis functions. One example of such a function is shown in Equation 3 below.

$$s_i(c_j) = (1 + \|c_i - c_j\|)^{-\epsilon}$$

Equation 3—Normalized Shepard Basis Function

Additionally, as discussed above, the coloration adjustment component 150 may be configured to perform color balancing in the augmented reality space, where a synthetic rendering is embedded in a seamless manner into a video stream. Here, the coloration adjustment component 150 could be configured to robustly track known color patches in the scene over time, and to use these color patches as color references for their supposed values. The coloration adjustment component 150 could then automatically balance rendered images to the video footage, adapting the rendering as the color of the video frames change (e.g., due to camera adjustments). For instance, the coloration adjustment component 150 could track the color patches based on the observation that desired color changes in the video stream are global. That is, these changes may be due to the camera automatically adjusting internal parameters such as exposure or gain. As such, the coloration adjustment component 150 can use the color patches in the scene that receive these color changes as constraints for balancing their known unbalanced values. Additionally, due to occlusions or specular reflections, some of tracked color patches may be corrupt. However, as these color distorted (e.g., occlusions, reflections, etc.) happen locally, the coloration adjustment component 150 may be configured to remove the distortions as outliers.

Figure 7:
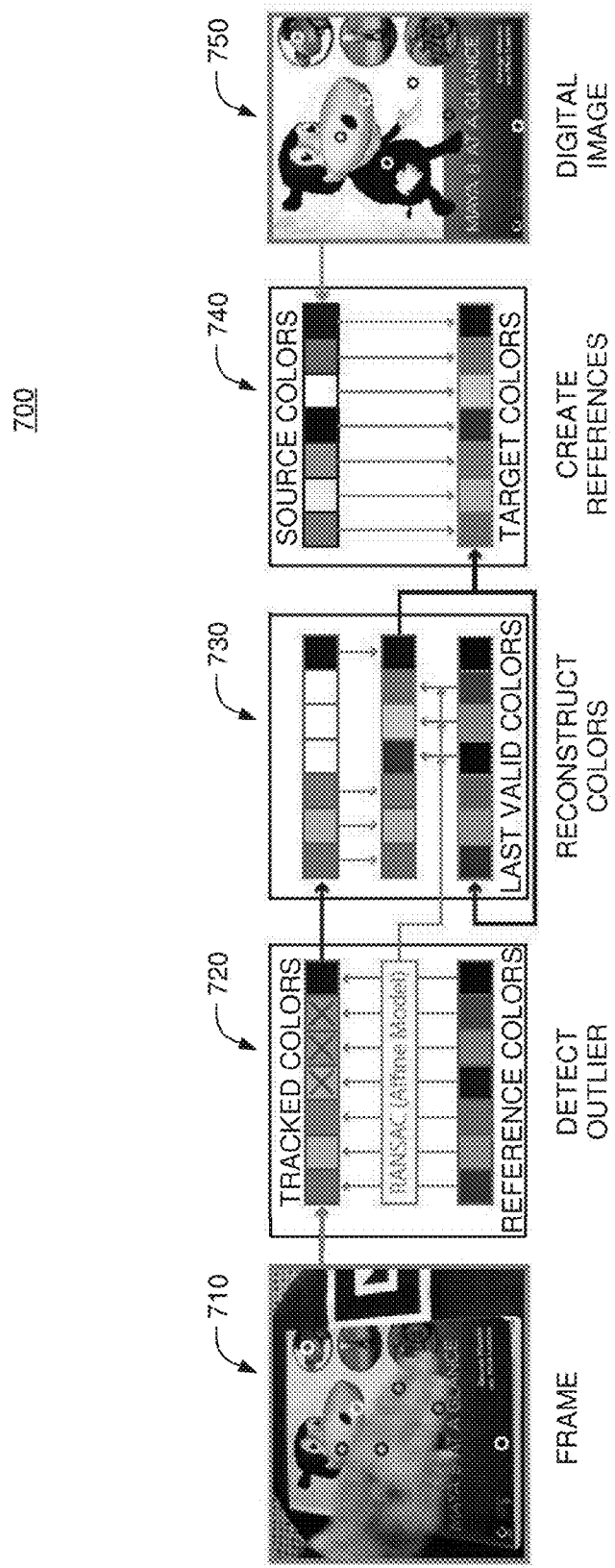
FIG. 7 is a diagram illustrating an example of adjusting coloration based on a reference object within a video stream, according to one embodiment described herein.

As an example, for each frame of the video stream, the coloration adjustment component 150 could be configured to extract color information from the frame, detect and remove any outliers within the frame, reconstruct colors for the removed outliers, and create color references for balancing the rendered objects within the stream (e.g., an augmented reality object inserted into the frame). An example of this is shown in the diagram 700 of FIG. 7. For instance, the coloration adjustment component 150 may extract colors $d_i$ from the video frame (e.g., the video frame 710), and may use position tracking to provide the positions in the image where the target colors are found. In one embodiment, the coloration adjustment component 150 is configured to use ARToolKit marker tracking. However, more generally, any other position tracking solution may be used, consistent with the functionality provided herein. Additionally, to reduce per-pixel noise, the coloration adjustment component 150 may perform a neighborhood averaging over a small window (e.g., 7 by 7).

The coloration adjustment component 150 could also detect one or more outlier color values within the frame (e.g., as shown in block 720). In detecting outliers within the frame, the coloration adjustment component 150 could fit a global model between the extracted $d_i$ and a set of reference colors $r_i$. For example, the reference colors $r_i$ could be taken from the digital image of the marker, or could be extracted from the first frames of the video in a pre-processing step. In order to keep the number of false positives low, the coloration adjustment component 150 could be configured to use the affine transformation model $c_i=Ar_i+t$, which can be computed analytically and may avoid over fitting to corrupted colors. The coloration adjustment component 150 could then detect outliers in the scene colors $d_i$ by fitting the affine model using random sample consensus algorithm, which may remove a majority of the corrupted colors within the frame. In order to further increase the robustness of the tracking, the coloration adjustment component 150 could separate the remaining inliers into two groups. For instance, the coloration adjustment component 150 could define trusted inliers as colors that have not been detected as outliers for more than a predefined number of frames (e.g., 3 frames), and the coloration adjustment component 150 could consider these trusted inliers as valid target colors. On the other hand, the coloration adjustment component 150 could define inlier colors that have been detected as outliers within the predefined number of frames as false positives, and these colors may be treated as outliers within the frame.

Once the corrupted colors are removed from the list of $d_i$, the coloration adjustment component 150 could reconstruct the removed colors using the last valid colors of each tracked point from the previous frames (e.g., as shown in block 730). For instance, the coloration adjustment component 150 could store these colors when a tracked value is regarded as a trusted inlier, and could replace corrupt color values within the frame by an updated version of their last valid value. As an example, the coloration adjustment component 150 could apply a global affine transformation by all trusted inlier colors since the last frame to update the last valid colors. In one embodiment, the coloration adjustment component 150 performs this color reconstruction only for comeback points.

Here, comeback points are defined as outliers that have been inliers for more than a particular number of frames (e.g., 10 frames). Doing so may remove any colors that were only detected as inliers for a short period of time, and may in turn increase the robustness of the algorithm.

The coloration adjustment component 150 could then create the final color references $(c_i, d_i)$ for use in color balancing the rendered objects (e.g., as shown in block 740). For example, the coloration adjustment component 150 could extract a corresponding color $c_i$ from the digital image of the marker for all di that are either trusted inliers or comeback points. Thus, the constraints $(c_i, d_i)$ describe the color transfer function from the rendered footage to the current video frame color space. Moreover, using a known marker in the scene (e.g., the cover of a book), the coloration adjustment component 150 could balance newly rendered footage to augmented the video and to increase the realism of the augmented reality application (e.g., as shown in the resulting image 750).

Figure 5:
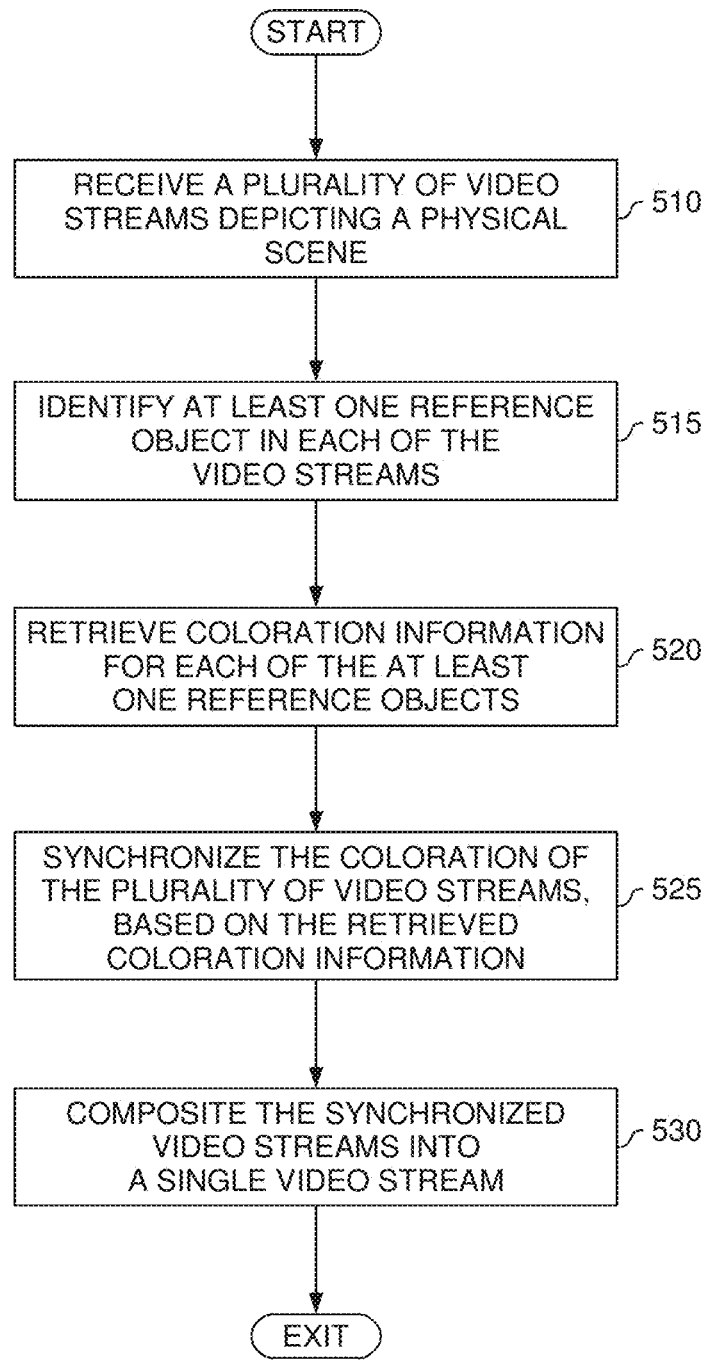
FIG. 5 is a flow diagram illustrating a method for compositing color balanced video streams based on a reference object within the video streams, according to one embodiment described herein.

FIG. 5 is a flow diagram illustrating a method for compositing color balanced video streams based on a reference object within the video streams, according to one embodiment described herein. As shown, the method 500 begins at block 510, where the coloration adjustment component 150 receives a plurality of video streams depicting a physical scene. Generally, the received video streams depict a single physical scene (e.g., a race track, a sporting event, an augmented reality scene, etc.), although the video streams may depict the physical scene from different angles and potentially at different points in time as well.

The coloration adjustment component 150 then identifies at least one reference object in a frame(s) of each of the video streams (block 515). It is broadly contemplated that a variety of techniques may be used to identify the reference object within a frame, both known and unknown, and embodiments described herein are not limited to the use of any particular technique for identifying the reference object(s) within the frame(s). Upon identifying the reference object(s) within the video streams, the coloration adjustment component 150 retrieves coloration information associated with each of the identified reference object(s) (block 520). For instance, assuming the reference object identified is a race car within the physical scene, the coloration adjustment component 150 could retrieve coloration information describing coloration of the race car under predefined lighting conditions. The coloration adjustment component 150 may also be configured with other data characterizing the shape of the reference object (e.g., the physical dimensions of the reference object, the geometric shape of the reference object, etc.). The coloration adjustment component 150 could use such data, for example, to determine a perspective by which the reference object is shown within the video stream, and could use such a perspective in interpreting the coloration data for the reference object.

The coloration adjustment component 150 then color balances each of the video streams, based on the retrieved coloration data (block 525). Here, each of the video streams may have a slightly different coloration due to the positioning of the cameras capturing the video streams and the lighting within the physical scene. Such differences in coloration may be particularly apparent when the video streams were filmed at different points in time. As an example, assuming the coloration data describes the reference object in particular predefined lighting conditions, the coloration adjustment component 150 could color balance each of the video streams to match the coloration of the reference object as described by the coloration data, thus altering the coloration of the video streams to match the particular predefined lighting conditions. In the depicted embodiment, the coloration adjustment component 150 then composites the color balanced video streams into a single composite video stream (block 530), and the method 500 ends. Advantageously, by color balancing the individual video streams before compositing the video streams together, embodiments can produce a higher quality composite video stream. Moreover, embodiments may produce such an improved composite video stream automatically by identifying the reference object(s) within the streams, thus avoiding the time consuming and expensive process of manually color balancing the video streams.

Figure 6:
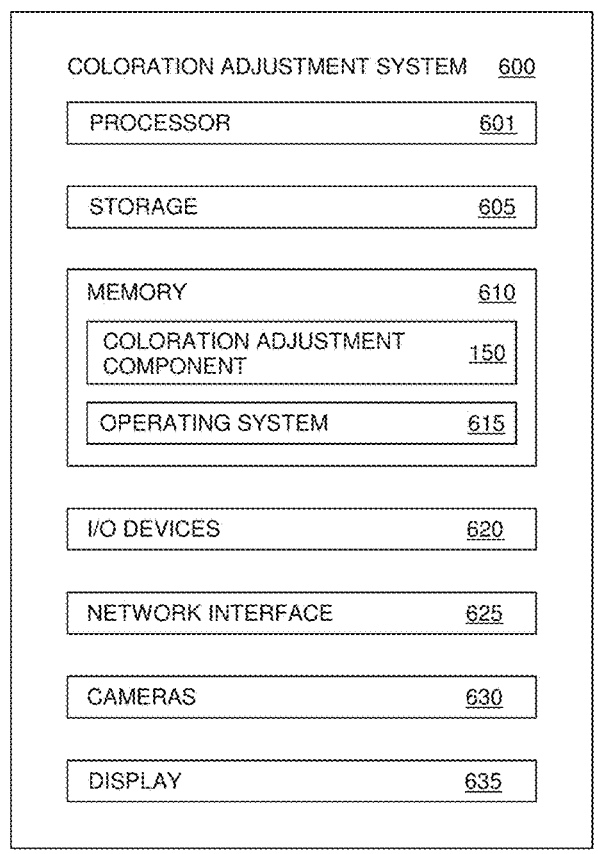
FIG. 6 is a block diagram illustrating an augmented reality device configured with an augmented reality component, according to one embodiment described herein.

FIG. 6 is a block diagram illustrating a coloration adjustment system configured with a coloration adjustment component, according to one embodiment described herein. In this example, the coloration adjustment system 600 includes, without limitation, a processor 600, storage 605, memory 610, I/O devices 620, a network interface 625, camera devices 120, and a display device(s) 130. Generally, the processor 600 retrieves and executes programming instructions stored in the memory 610. Processor 600 is included to be representative of a single CPU, multiple CPUs, a single CPU having multiple processing cores, GPUs having multiple execution paths, and the like. The memory 610 is generally included to be representative of a random access memory. The network interface 625 enables the coloration adjustment component 150 to connect to a data communications network (e.g., wired Ethernet connection or an 802.11 wireless network). Further, while the depicted embodiment illustrates the components of a particular coloration adjustment system 600, one of ordinary skill in the art will recognize that embodiments may use a variety of different hardware architectures. In one embodiment, the coloration adjustment component 150 is configured for use with a projection system display device 635 comprising one or more projection devices. Moreover, it is explicitly contemplated that embodiments of the invention may be implemented using any device or computer system capable of performing the functions described herein.

The memory 610 represents any memory sufficiently large to hold the necessary programs and data structures. Memory 610 could be one or a combination of memory devices, including Random Access Memory, nonvolatile or backup memory (e.g., programmable or Flash memories, read-only memories, etc.). In addition, memory 610 and storage 605 may be considered to include memory physically located elsewhere; for example, on another computer communicatively coupled to the augmented reality device 100. Illustratively, the memory 610 includes an augmented reality component 110 and an operating system 615. The operating system 615 generally controls the execution of application programs on the augmented reality device 100. Examples of operating system 615 include UNIX, a version of the Microsoft Windows® operating system, and distributions of the Linux® operating system. Additional examples of operating system 615 include custom operating systems for gaming consoles, including the custom operating systems for systems such as the Nintendo DS® and Sony PSP®.

The I/O devices 620 represent a wide variety of input and output devices, including displays, keyboards, touch screens, and so on. For instance, the I/O devices 620 may include a display device used to provide a user interface. As an example, the display may provide a touch sensitive surface allowing the user to select different applications and options within an application (e.g., to select an instance of digital media content to view). Additionally, the I/O devices 620 may include a set of buttons, switches or other physical device mechanisms for controlling the coloration adjustment system 600. For example, the I/O devices 620 could include a set of directional buttons used to control aspects of a video game played using the coloration adjustment system 600.

As discussed above, the coloration adjustment component 150 is generally configured to apply color balancing techniques to augment the appearance of an object within a displayed scene. For instance, the coloration adjustment component 150 could capture a visual scene for display. Here, the visual scene includes a physical object. Additionally, the visual scene may be captured using one or more camera devices. The coloration adjustment component 150 could also identify the physical object as a first predetermined object type, based on one or more object identifiers associated with the physical object. Moreover, the coloration adjustment component 150 could retrieve visual characteristics information corresponding to the first predetermined object type, where the visual characteristics information includes coloration of the physical object under normalized lighting conditions. The coloration adjustment component 150 could then rendering a sequence of frames for display that include the first object, where the coloration of at least one object (either physical or virtual) in the rendered sequence of frames is augmented based on the visual characteristics information.

Of note, while several examples are given above with respect to an augmented reality embodiment, it is broadly contemplated that the techniques described herein may be used in numerous other environments as well. For instance, as discussed above, embodiments may provide coloration adjustments for an image editing application (e.g., implemented on a general purpose computing system, implemented as a web application, etc.). For example, a user could specify one or more reference points within an image, and may further specify a second one or more reference points within a reference image, where each of the one or more reference points maps to a respective one of the second one or more reference points. In such an example, the image editing application may adjust the coloration of at least a portion of the image, based on a calculated coloration difference between the reference point(s) and the second reference point(s).

As another example, one embodiment is configured to provide coloration adjustments for a video application (e.g., running on a general purpose computing system, implemented in graphics hardware, etc.). For instance, one or more reference points could be determined (e.g., automatically, manually specified by a user, etc.) within at least one frame of captured video, and the one or more reference points could be mapped (again, automatically, manually, etc.) to a second one or more reference points within a reference image. The coloration of at least a portion of the at least one frame could then be adjusted, based on a coloration difference between the one or more reference points and the corresponding points in the second one or more reference points. In one embodiment, where the captured video is to be composited with a second video stream, the coloration at least one frame of the second video stream may be adjusted as well. For instance, the coloration of the second video stream could be adjusted based on the coloration difference computed based on the one or more reference points within the captured video frames, or the coloration could be adjusted based on a coloration difference calculated using reference points within the second video stream and the reference image (or a separate, distinct reference image), or both. Advantageously, doing so helps to ensure consistent coloration between the two (or more) video streams.

In the preceding, reference is made to embodiments of the invention. However, the invention is not limited to specific described embodiments. Instead, any combination of the preceding features and elements, whether related to different embodiments or not, is contemplated to implement and practice the invention. Furthermore, although embodiments of the invention may achieve advantages over other possible solutions or the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations or block diagrams of methods, apparatus (systems) and computer program products according to embodiments of the invention. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access environmental illumination data available in the cloud. For example, an augmented reality component 110 could execute on an augmented reality device 100 operated by a user and could collect environment illumination data pertaining to the user's current environment. In such a case, the augmented reality component 110 could transmit the collected data to a computing system in the cloud for storage. When the user again returns to same environment, the augmented reality component 110 could query the computer system in the cloud to retrieve the environmental illumination data and could then use the retrieved data to realistically model lighting effects on objects within an augmented reality scene displayed on the augmented reality device 100. Doing so allows a user to access this information from any device or computer system attached to a network connected to the cloud (e.g., the Internet). As another example, reference image data could be stored on a computing system in the cloud, and upon detecting a particular reference object within a captured visual scene, the coloration adjustment component 150 could query the computing system in the cloud to retrieve the reference image data for use in augmented the coloration of at least a portion of the captured visual scene.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams or flowchart illustration, and combinations of blocks in the block diagrams or flowchart illustration, can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method of adjusting coloration, the computer-implemented comprising:
   receiving a selection of one or more source reference points within a source image depicting a source lighting condition;
   receiving a selection of one or more target reference points within a target image depicting a target lighting condition distinct from the source lighting condition;
   determining a coloration difference between a coloration of the one or more source reference points within the source image and a coloration of the one or more target reference points within the target image; and
   normalizing the distinct, depicted source and target lighting conditions by adjusting, by operation of one or more computer processors, the coloration of at least a portion of the source image based on the determined coloration difference and to correspond more closely to the coloration of the target image, whereafter the source image is output.

2. The computer-implemented method of claim 1, wherein the source image comprises one of a plurality of frames of a first video stream.

3. The computer-implemented method of claim 2, wherein the target image comprises one of a plurality of frames of a second video stream, distinct from the first video stream.

4. The computer-implemented method of claim 1, wherein the selection of the one or more source reference points specifies a plurality of source reference points within the source image, inclusive of the one or more source reference points, wherein the selection of the one or more target reference points specifies a plurality of target reference points within the target image, inclusive of the one or more target reference points, wherein each of the plurality of source reference points corresponds to a respective one of the plurality of target reference points.

5. The computer-implemented method of claim 4, wherein determining the coloration difference further comprises:
   for each of the plurality of source reference points within the source image, determining a coloration difference between the source reference point and a corresponding target reference point from the plurality of target reference points.

6. The computer-implemented method of claim 1, further comprising:
   providing an interface depicting the source and target images in order to facilitate the selections, wherein the source image comprises one of a plurality of frames of a first video stream, wherein the target image comprises one of a plurality of frames of a second video stream, distinct from the first video stream.

7. The computer-implemented method of claim 6, wherein the selection of the one or more source reference points specifies a plurality of source reference points within the source image, inclusive of the one or more source reference points, wherein the selection of the one or more target reference points specifies a plurality of target reference points within the target image, inclusive of the one or more target reference points, wherein each of the plurality of source reference points corresponds to a respective one of the plurality of target reference points, wherein determining the coloration difference comprises:
   for each of the plurality of source reference points within the source image, determining a coloration difference between the source reference point and a corresponding target reference point from the plurality of target reference points.

8. The computer-implemented method of claim 7, wherein the coloration of the portion of the source image is adjusted based further on profile information corresponding to the one or more source reference points or the one or more target reference points, wherein the profile information describes coloration under predefined conditions.

9. The computer-implemented method of claim 8, wherein the profile information is retrieved from a non-transitory memory device, wherein the one or more source reference points and the one or more target reference points are of a visual scene depicted in the source and target images, wherein the portion of the source image corresponds to an object depicted in the source and target images.

10. The computer-implemented method of claim 9, wherein determining the coloration difference further comprises:
 determining an aggregate coloration difference for the visual scene, based on a plurality of coloration differences, the plurality of coloration differences including, for each of the plurality of source reference points within the source image, the coloration difference determined for the respective source reference point.

11. A non-transitory computer-readable medium containing computer program code executable to perform an operation for adjusting coloration, the operation comprising:
 receiving a selection of one or more source reference points within a source image depicting a source lighting condition;
 receiving a selection of one or more target reference points within a target image depicting a target lighting condition distinct from the source lighting condition;
 determining a coloration difference between a coloration of the one or more source reference points within the source image and a coloration of the one or more target reference points within the target image; and
 normalizing the distinct, depicted source and target lighting conditions by adjusting, by operation of one or more computer processors when executing the computer program code, the coloration of at least a portion of the source image based on the determined coloration difference and to correspond more closely to the coloration of the target image, whereafter the source image is output.

12. The non-transitory computer-readable medium of claim 11, wherein the source image comprises one of a plurality of frames of a first video stream.

13. The non-transitory computer-readable medium of claim 12, wherein the target image comprises one of a plurality of frames of a second video stream, distinct from the first video stream.

14. The non-transitory computer-readable medium of claim 11, wherein the selection of the one or more source reference points specifies a plurality of source reference points within the source image, inclusive of the one or more source reference points, wherein the selection of the one or more target reference points specifies a plurality of target reference points within the target image, inclusive of the one or more target reference points, wherein each of the plurality of source reference points corresponds to a respective one of the plurality of target reference points.

15. The non-transitory computer-readable medium of claim 14, wherein determining the coloration difference further comprises:
 for each of the plurality of source reference points within the source image, determining a coloration difference between the source reference point and a corresponding target reference point from the plurality of target reference points.

16. A system of adjusting coloration, the system comprising:
 one or more computer processors; and
 a memory containing computer program code that, when executed by the one or more computer processors, performs an operation comprising:
  receiving a selection of one or more source reference points within a source image depicting a source lighting condition;
  receiving a selection of one or more target reference points within a target image depicting a target lighting condition distinct from the source lighting condition;
  determining a coloration difference between a coloration of the one or more source reference points within the source image and a coloration of the one or more target reference points within the target image; and
  normalizing the distinct, depicted source and target lighting conditions by adjusting the coloration of at least a portion of the source image based on the determined coloration difference and to correspond more closely to the coloration of the target image, whereafter the source image is output.

17. The system of claim 16, wherein the source image comprises one of a plurality of frames of a first video stream.

18. The system of claim 17, wherein the target image comprises one of a plurality of frames of a second video stream, distinct from the first video stream.

19. The system of claim 16, wherein the selection of the one or more source reference points specifies a plurality of source reference points within the source image, inclusive of the one or more source reference points, wherein the selection of the one or more target reference points specifies a plurality of target reference points within the target image, inclusive of the one or more target reference points, wherein each of the plurality of source reference points corresponds to a respective one of the plurality of target reference points.

20. The system of claim 19, wherein determining the coloration difference further comprises:
 for each of the plurality of source reference points within the source image, determining a coloration difference between the source reference point and a corresponding target reference point from the plurality of target reference points.

\* \* \* \* \*